June 23, 1959 O. P. FUCHS ET AL 2,891,724

AUTOMATIC APPARATUS FOR TRANSFORMING STATISTICAL OR STOCHASTICAL FUNCTIONS

Filed May 14, 1952 2 Sheets-Sheet 1

INVENTORS.
OTTO PAUL FUCHS
HORST KOTTAS
BY Raymond B. Parker
ATTORNEY

INVENTORS
OTTO PAUL FUCHS
HORST KOTTAS
BY Ralzemond B. Parker
ATTORNEY

United States Patent Office 2,891,724

Patented June 23, 1959

2,891,724

AUTOMATIC APPARATUS FOR TRANSFORMING STATISTICAL OR STOCHASTICAL FUNCTIONS

Otto Paul Fuchs, Haverford, Pa., and Horst Kottas, Vienna, Austria

Application May 14, 1952, Serial No. 287,764

Claims priority, application Austria April 2, 1952

4 Claims. (Cl. 235—168)

This invention relates to methods and automatic apparatus for utilizing statistical or stochastical functions (distributions) in arithmetic calculations by choosing a typical or representative group of adjacent statistical entries to serve as physical models for making computations from such functions. More particularly, the invention relates to methods and automatic apparatus for computing unknown parameters of problems encountered in science, by means of physical models representing successions or lots of statistical elements.

A general object of the invention is to provide methods and apparatus for combining given model functions, called primary functions, with given transforming functions to obtain new functions, called secondary functions.

Another object of the invention is to provide methods and apparatus to transform functions by the introduction of programming signals or succession of such programming signals, which actuate special electrical circuits or functionally equivalent mechanical systems.

Another object of the invention is to provide probability generators, consisting of devices adapted to generate successions of random-distributed physical, preferably electric signals. These generators are used to produce physical models, called "collectives" of the desired statistical primary functions.

Another object of the invention is to provide methods and apparatus to record signals of a collective on light-sensitive film or on magnetic material or similar record carriers and thus to obtain records of statistical or stochastical processes.

Another object of the invention is to provide a method to control apparatus provided by the invention in accordance with functions of known analytical qualities to obtain secondary successions of desired analytical characteristics.

Another object of the invention is to provide methods and apparatus of the type described above, in which time-saving electric or electronic equipment is employed, such as electromagnetic relays, step-by-step switches, gas discharge tubes, thermionic tubes, semiconductor devices, etc., which are arranged to scan the probability records and handle the signals picked up at high speed.

Other objects of the invention will become apparent as the specification proceeds, in which hereinafter the nature and operation of the methods and apparatus of the invention will now be explained.

The invention is founded on the fact that all natural processes of a statistical character can be represented by physical models. These models are formed by successive physical signals of a primary function. In order to utilize this method to perform calculations, one must differentiate among at least two different kinds of signals such as white and black balls in a basket. In the sequence of selection of individual balls these two kinds of signals alternate according to the laws of chance.

The kind of signal is described by means of a characteristic such as the color of a ball. A finite sequence of such alternating black and white signals, used for the model reproduction of a statistical process, is referred to as a "collective." Herein the interpretation is given to this concept as it has been introduced into mathematical statistics by Professor Richard von Mises of Harvard University, in the book entitled "Probability, Statistics and Truth," published by Springer Publishing House, New York, N.Y. According to Prof. R. v. Mises, a collective is determined by the following three statistical characteristics (parameters):

(1) The extent of the collective (Z), that is, the total number of all elements to be found in the sequence, disregarding their characteristics.

(2) The number of different characteristics ($Z_m$) to be found in the sequence.

(3) The limit of the relative frequency of occurrence ($p_r$) which is approached by the quotient ($H_r/Z_e$) as ($Z_e$) approaches infinity, where ($Z_e$) is a part of a collective which consists of Z elements. The value ($H_r$) here designates the number of all elements (absolute frequency of occurrence) having the characteristic ($r$) within a collective of extent ($Z_e$) elements.

When (Z) remains finite, too, the above quotient may be regarded as an approximation to the limiting value of the relative frequency of occurrence ($p_r$), if its value is interpreted in keeping with the distribution laws.

In particular, the present invention is based on the following two realizations:

(1) Two collectives are statistically equivalent to each other if the previously-mentioned three parameters ($Z_e$), ($Z_m$) and ($p_r$) have the same magnitude in each collective, whether or not the characteristics occurring in the collectives coincide or not.

(2) A given collective having certain statistical characteristics (parameters) can be transformed into a collective with different statistical characteristics (parameters) by the subjection of its elements to statistical operations, such as have been suggested, for example, by R. v. Mises.

These operations are, for instance, according to R. v. Mises, the statistical operations of "selection," "mixing," "division" and "combination," or the processes of segregation (disjunction) and desegregation (conjunction), the parenthetical terms being adopted herein by the applicants. By segregation (disjunction) is meant the dividing of the number of characteristics into at least two groups. By desegregation (conjunction) is meant the joining or intermingling of two or more groups of characteristics with one another or with another group.

In the following, the collective with which, during a computational process, the first of the statistical operations is undertaken, will be referred to as the basic collective or alpha-collective. The further collectives, obtained successively through transformations from the alpha-collective, will be designated in natural sequence the beta, gamma, etc. collectives.

In substance, the invention comprises:

(1) Means whereby a collective, i.e. a sequence of physical signals of different statistical character, may be obtained automatically; the means provided is designated as a probability generator.

(2) Means whereby a collective, once it has been obtained in any manner, can be stored in such a way that at any later time, by some sensing process a signal sequence of statistical character may be obtained which will be equivalent to the original collective; the product of the storage is to be designated the collective preserve. Collective preserves represent a statistical standard which can be used for the purposes of normalizing and comparison.

(3) Means whereby statistical operations can be performed upon a sequence of signals equivalent to a collective, which have been fed into the installation, automatically, thereby transforming collectives or the functions represented by them into other collectives or functions equivalent to them, including all means for the automatic determination and registration of the statistical parameters of the collectives derived in the described manner.

(4) Method for obtaining statistical parameters, whereby initially a collective is transformed by application of statistical operations into a collective having parameters other than those initially stipulated and whose parameters are determined and, if desired, registered.

It is an economic as well as a scientific advantage of the invention that in a computer built in accordance with the invention there is no need for a knowledge of analytical expressions. Besides the knowledge of statistical parameters of the alpha-collective, it is only necessary to understand a certain statistical mechanism hereinafter described to provide a substitution for a natural process quantitatively described, in order to solve numerically appropriate computational problems. Thus, certain unbiased events or occurrences are available in nature which are describable statistically in that they obey known probability laws. These laws are applied by analytical computation of the numerical results of groups of natural occurrences. Many statistical problems, however, are so complex that human capabilities are exceeded. Thus, it is advantageous to employ automatic methods utilizing nature itself to give the correct answers by which all sources of error inherent in analytical and algebraical methods will be avoided and high speed computations are possible. By this method, the further advantage is present that by utilization of known analytic functions, it has so far only been possible to solve statistical problems by approximation thereby giving incorrect and inaccurate results as compared with an automatic computation of natural events which are represented by physical models consisting of successions of signals in a random distribution.

With the above objects, recognitions, and features in mind, reference will now be had to the accompanying drawings, in which embodiments of the invention are illustrated diagrammatically.

Figure 1:
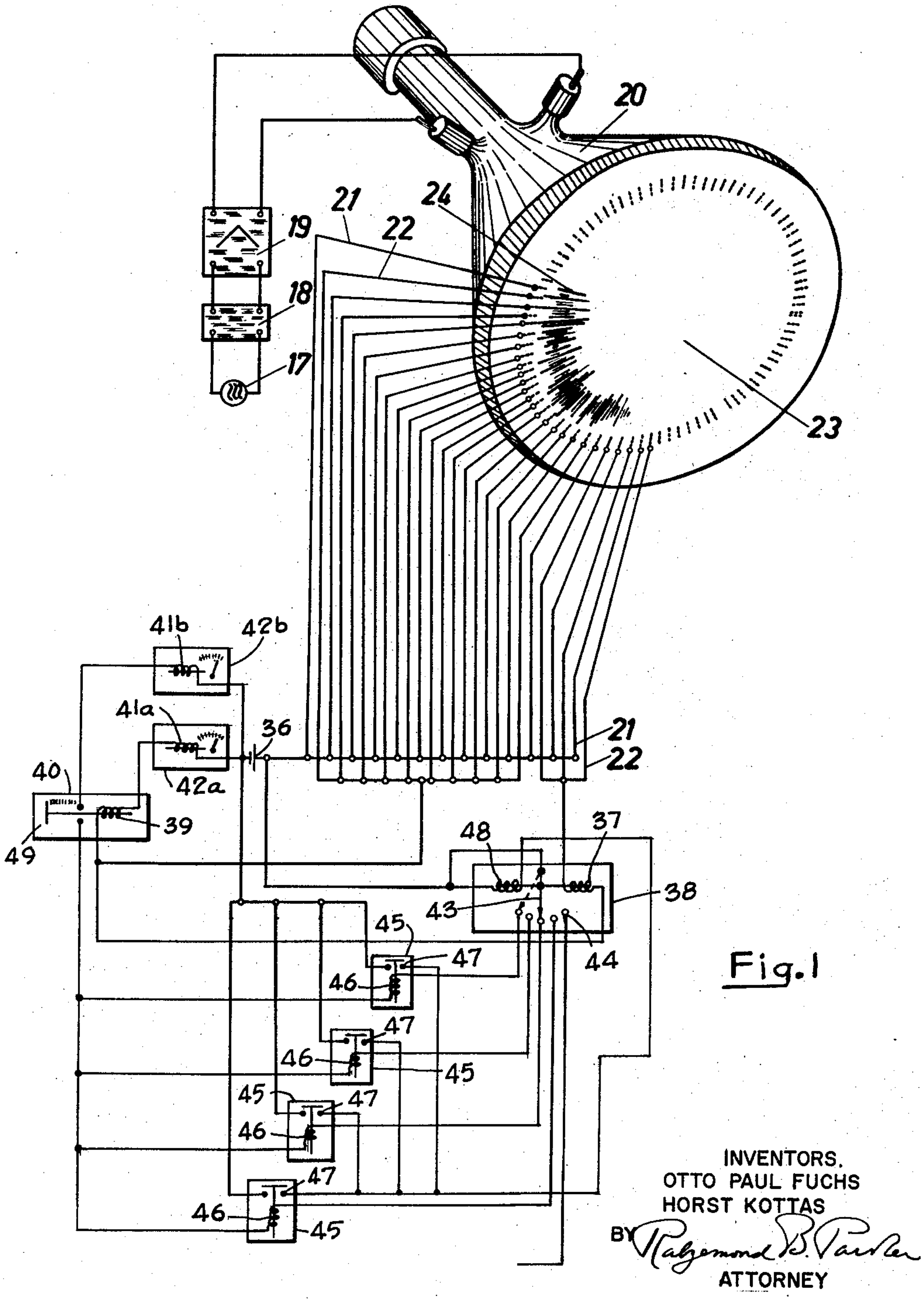
Fig. 1 shows apparatus embodying the invention and including a source of random signals and an electrical network for detecting such signals and for the transformation of collectives.

It is known that there are many methods of obtaining random pulses of fairly uniform distribution by micromolecular effects. Examples of such effects are the electron emission effect, the small-shot effect, the ionization effect, the secondary emission effect, etc. In Fig. 1, numeral 17 represents a hot-cathode tube, working in the saturation range of the anode current characteristics to produce random pulses. The statistical effect of electric current in the starting and saturating of the electron tubes is known and taught in such publications as, chapter 8 entitled "Shot Effect" of the book "Frequency Analysis, Modulation and Noise" by S. Goldman, published by McGraw-Hill in 1948. The frequency spectrum of said pulses is controlled and flattened in a band-pass filter 18, and thereafter the pulses (equivalent to physical signals hereinabove mentioned) are amplified in a thermionic amplifier 19 connected to the deflector plates of a known cathode ray oscilloscope 20, such as illustrated and described in the book by Chance, Hulsizer, MacNichol and Williams, vol. 20 of the Radiation Laboratory Series, entitled "Electronic Time Measurements," pages 216–219, and bearing copyright date of 1949. In the latter, circular deflection will produce a random pulse frequency spectrum 24 distributed around a circularly arranged set of electrodes 21, 22. These electrodes consist of short pieces of wire melted into, or otherwise affixed upon, the glass envelope 23 of the cathode ray tube. Obviously the electron beam will trace a waveform such as shown in Fig. 1. Each of the electrodes is of similar geometric configuration and may be arranged with photo-responsive material contained between two adjacent ones of the electrodes which are coupled respectively with one lead at terminal 22 and another lead at terminal 21 so that there will be developed a signal between terminals 22 and 21 in response to the peak amplitude of a waveform on the oscilloscope face 23 which will reach the area of the electrodes. Thus, the terminals 21 and 22 which are coupled to two sets of alternately disposed electrodes comprise disjunction elements. These disjunction elements may be connected in one or more groups of complementary elements as indicated by the separate leads 21 and 22 of Fig. 1 so that the signal pulses will be developed between the leads 21 and the corresponding leads 22 of a respective group of elements.

Figure 3:
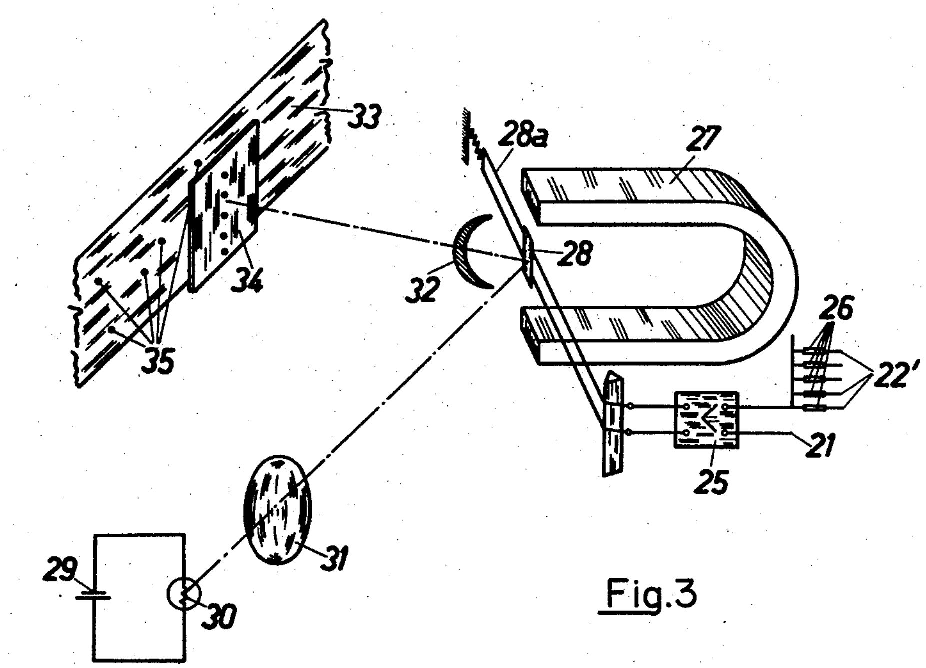
Fig. 3 shows apparatus for recording the signals of a collective on a recording medium such as a light sensitive film.

The recording of a collective will be explained with reference to Fig. 3. Signals of random distribution, generated by a random pulse generator such as the cathode ray tube of Fig. 1, of which only the disjunction elements 21, 22 are shown by way of example in Fig. 3, are fed to the impedances 26 and through the amplifier 25 to the loop 28*a* of an electromagnetic oscillograph. These impedances 26 have different effective values, which results in that to each signal which comes from a certain disjunction element there pertains one and only one very definite mirror deflection. The loop 28*a* will be deflected by action of the magnet 27 upon the current carrying loop in the manner of usual galvanometer action and turn the mirror 28 as a function of the current of the successive random signals. A light source 30 fed by a battery 29 projects a beam of light which is concentrated by the optical lenses 31 and 32, on the mirror 28 and on the film 33, respectively. The film is partly covered by a plate 34 or the like, having a number of apertures arranged in a straight line. The film is transported intermittently, and in synchronism with the film transport, random signals are fed to the oscillograph loop, similarly as in the conventional systems of sound recording on film. Thus single spots of the film will be exposed to the light beam. The developed film will show a number of black spots 35, which are the visible, physical record of the signals of a collective. Signals from a certain impedance will always be recorded on one and the same line on the film. Recording on the film therefore is effected in increments of one line each. The whole film is then called a collective record and may be read similarly as a sound film by means of photo-electric cells. Compared with collectives produced by a probability generator, a collective record has many advantages, e.g., it has constant statistical properties and may be duplicated and distributed to serve as a statistical standard.

The network of Fig. 1 is particularly suitable to give solutions of the Bernouillian formula $$P(p,n,N)=\binom{N}{n}p^{n}\cdot q^{N-n}$$

The constants incorporated in this network may be, e.g., $p=0.2$, $q=0.8$, $N=4$, where "$p$" is the basic probability for "favorable" events determined from previous trials, "N" is the number of trials in one series, "$n$" is the number of favorable or acceptable events which occurs in series "N," "$q$" is $1-p$, and "P" is a function of "$p$, $n$, N." In the position shown in Fig. 1 the contact arm 43 represents the parameter $n=2$.

The network of Fig. 1 will now be explained by reference to its mode of operation. 21, 22 are parallel conductors consisting of the disjunction elements of a probability generator also shown in Fig. 1. Disjunction is one of the well known fundamental statistical operations. This may be explained in a generalized example as follows: To produce a collective having e.g., twenty-five different characteristics, twenty-five photoelectric cells or similar sources of signals are required, each of which is connected to a separate amplifier. The outputs of the twenty-five amplifiers are connected to provide twenty-five disjunction elements.

The specific example of Fig. 1 shows two sets of disjunction elements 21 and 22, each set having different numbers of elements connected in parallel. Assume that in one of which sets twenty disjunction elements and in the other one five disjunction elements are connected in parallel. Following the terminology of the theory of probability, the latter is called the favorable events set, whereas the former is called the unfavorable events set. Thus in the example shown there are twenty possibilities for unfavorable, and five possibilities for favorable events, the probability for an event to be favorable being $p=0.2$, and to be unfavorable being $q=0.8$.

Figure 2:
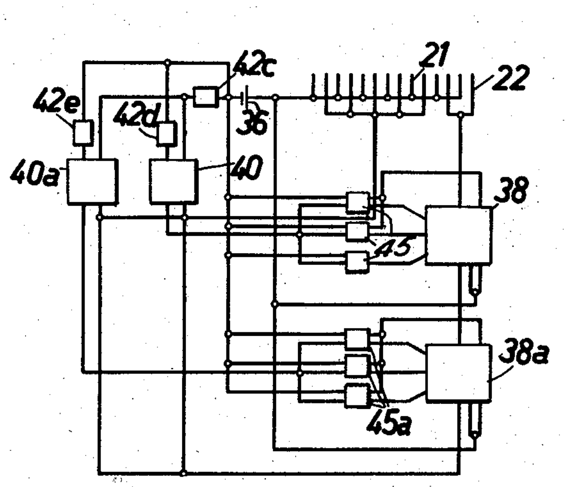
Fig. 2 is an illustration of another network for the transformation of collectives in accordance with this invention.

To produce a registration of the collective record from the circuit of Figs. 1 and 2 a large number of signals of random distribution will pass the disjunction elements. Favorable signals energize the impedance 37 of the selector 38 consisting of a step-by-step switch, the contact arm 43 of which is advanced one step by every favorable signal. The selector 38 is shown in general form to indicate either a suitable solenoid actuated switch or any electronic equivalent such as a resettable ring counter which are well known in the art. In general, each of the elements shown in Figs. 1 and 2 are diagrammatic to represent time saving electric or electronic equipment and may employ either electromagnetic relays, tube circuits or other electronic equivalents which are arranged to scan the probability records and handle the signals picked up at high speed.

A circuit will be closed only when a counter 40, consisting of a relay responsive to close a single set of normally open contacts in response to and after a whole train of N pulses, favorable and unfavorable ones, which have passed the relay impedance 39. Thus the counter 40 constitutes a counting relay circuit such as described in chapter 11 of the book entitled "The Design of Switching Circuits" by Keister, Ritchie and Washburn published in 1941 by D. Van Nostrand Company, Inc. or some other type of electronic counter circuits commonly known such as chains of flip-flop counters for dividing the succession of random pulses into trains of N pulses. Similarly constructed counters 42*a* and 42*b* are respectively arranged to count the complete number of signal pulses and the number of complete trains. After each train of N pulses a circuit is closed, which extends from the negative pole of the battery 36 through the counting relay 42*b*, the contact pair 49 of counter 40, one of four counters or adding relays 45, the contact arm 43 of the step-by-step switch 38, and thence to the positive pole of the battery 36. This circuit will be closed only for a short time so that a pulse is produced, to which the impedance 46 of the selected counter 45 will respond in dependence of the respective position of the contact arm 43. The energized impedance 46 will actuate and close a corresponding contact pair 47 of the selected counter 45. Each counter 45 may be, for example, an arithmetic register or display device for indicating the final count, or any other suitable electronic equipment. The contact pair 47 of the selected counter 45 is closed only for a short time in a circuit which extends from the negative pole of the battery 36 through the contact pair 47 and a returning impedance 48 to the positive pole of the battery 36. The impedance 48, forming a part of the step-by-step selector switch 38, is arranged to return the contact arm 43 to its zero starting position when energized.

At the passage of each favorable current pulse, impedance 37 steps along the movable contact arm 43 of selection switching mechanism 38 by one contact step. This connects the positive terminal of current source 36 in turn to the next-following contact 44 in line. Connected to each of the contacts 44 of the switching mechanism 38 is one of the accumulator control mechanisms 45, the impedance 46 of which, during current passage, operates to close its associated contact pair 47. In this case, a circuit is closed which leads from the positive terminal of the current source 36 through reset impedance 48 of stepping switch 38 back to the negative terminal of the current source. The two terminals of each impedance 46 are connected respectively to its respective selector contact 44 and to the negative terminal of current source 36 through the contact pair 49 of counter 40 and thereby through the accumulator mechanism 42*b*.

The number of counting steps, to be set at control element 40, at the end of which contact is always made, is referred to as the series magnitude (N) of the sequence of signals. Accumulator mechanism 42*b* carries out registration of the number of series elapsed up to a point in time under consideration. If now the "favorable cases" are assigned to those disjunction elements 21 and 22 connected to impedance 37, then the control mechanisms 45 register how many "favorable cases" of number ($n$ equal to 0, 1, 2, 3, etc.) have occurred within signal sequences of the extent of the series magnitude (N).

Thus a cycle of operations of the apparatus shown in Fig. 1 has been completed and the same process begins again. Once more trains of N signals introduced by the disjunction elements 21, 22 are scanned to find out how many favorable signals have been in the respective trains. The probability factors $p_{(n=0;\ 1;\ 2;\ 3;\ 4;\ N=4)}$ of every 0, 1, 2, 3, or 4 favorable events occurring in trains of N events of a statistical succession are stored by counters associated with relays 46. These five numbers $p_{n=0}$ to $p_{n=4}$ are the computed ordinates of the Bernouillian formula, provided that a large number of trains N have passed through the network of Fig. 3. The Bernouillian distribution is valid for an infinite number of events.

Similar results may be obtained with a network as shown in Fig. 2, in which like reference numerals designate like parts. In the system of Fig. 2 the operation is similar to that of Fig. 1 except that provision is made for simultaneously affording registration of data from the same sequence of statistical information arriving at elements 21 and 22 in accordance with two physical models constructed from trains having different numbers of elements N and N*a*, as provided at the two transfiguraters 40 and 40*a*. Stepping switches 38 and 38*a* are coupled with the corresponding counters in the same manner as shown in connection with Fig. 1.

From the above it is obvious that the invention enables statistical computation involving variable parameters. It is known that computation is difficult in cases where, e.g., the probability varies according to a complicated analytical function. In the case of the simple Bernouillian formula, e.g., the formula $p=f(p_i)$ may be introduced by the use of corresponding controls associated with the disjunction elements.

An important improvement provided by the invention is the high speed of computation enabled. E.g., a collective of $10^7$ signals may be handled by electronic devices performing the statistical transformations and operations at a speed of $10^5$ or more signals per second. Thus an electronically produced collective record may be reproduced in a few seconds.

We claim:

1. Apparatus for statistical purposes, comprising, in combination, a generator for producing a succession of electrical signals of random distribution, means connected to said generator for receiving said signals in a random manner on a plurality of different electrically conductive channels, means segregating said channels into at least two groups, one group of such channels being characterized as receiving acceptable signals and the other group of such channels being characterized as receiving non-acceptable signals, first counting means for counting all of the signals received by both groups of channels and for limiting the sequence of such signals to a given number, second counting means for counting the number of signals received by the acceptable group of channels, and means connecting said first and second counting means and discontinuing the counting operation of the second counting means when the sequence of signals counted by said first counting means reaches said given number.

2. Apparatus for statistical purposes comprising, in combination, a generator for producing a succession of electrical signals of random distribution, means connected to said generator for receiving said signals in a random manner on a plurality of different electrically conductive channels, means segregating said plurality of channels into at least two groups of channels and providing a common output lead for each group, one of said channel groups being characterized as receiving acceptable random signals from the generator and conveying these acceptable signals on its common output lead and the other of said channel groups being characterized as receiving non-acceptable random signals from the generator and conveying these non-acceptable signals on its common output lead, primary counting means operatively associated with the common output leads of both groups of channels for counting all of the signals conveyed thereby, a plurality of secondary counting means separately connected to said primary counting means, and means responsive to the signals conveyed by the common output lead of the channel group receiving acceptable random signals and depending upon the quantity of such acceptable signals conveyed thereby for selecting one of the secondary counting means for operation, said selected secondary counting means becoming operative to count when the primary counting means reaches a predetermined counting value.

3. Apparatus for statistical purposes comprising, in combination, means connectible to a source of successive signals of random distribution and for receiving such signals on a plurality of different electrically conductive channels, said plurality of channels being segregated into two sets of channels in accordance with a prearranged probability ratio and each having a common output lead for the signals received by its respective channels, one of said channel sets receiving random signals characterized for statistical purposes as "favorable" and transmitting the same on its common output lead and the other of said channel sets receiving random signals characterized for statistical purposes as "unfavorable" and transmitting the same on its common output lead, counting means associated with said common output leads for receiving and counting all of the signals transmitted thereby and being effective to group the signals thus received into successive sequences of such signals and being further effective to generate electrical signals signifying the ends of the signal sequences, a plurality of counting circuits connected to the counting means in circuit parallel relation to one another and adapted when operative to receive a sequence ending signal generated by the counting means and to cumulatively store the number of such signals received, and selector switch means for enabling a selected one of the counting circuits to become operative to receive a sequence ending signal from the counting means, said selector switch means being operatively associated with the output lead conveying the "favorable" signals and functioning in response to the quantity of "favorable" signals in each signal sequence counted by the counting means for selecting one of the counting circuits to receive the sequence ending signal generated by the counting means.

4. Apparatus for statistical purposes comprising, in combination, means connectible to a source of signals of random distribution and for receiving such signals in serial relation to one another on a plurality of different electrically conductive channels, said plurality of channels being segregated into at least two groups of channels in accordance with a prearranged probability ratio of the groups to one another, one of said channel groups receiving random signals characterized for statistical purposes as "favorable" and the other of said channel groups receiving random signals characterized for statistical purposes as "unfavorable," counting means associated with said two or more groups of channels for receiving all of such signals therefrom and being effective to count the signals thus received and to divide such counted signals into successive trains of signals of predetermined numbers of signals, said counting means being further effective to generate an electrical signal signifying the end of each such signal train, a plurality of counting circuits each corresponding to a different quantity of "favorable" signals expected in said signal trains, said counting circuits being connected in circuit parallel relation to said counting means and adapted when operative to receive the train ending signals generated by the counting means and to cumulatively store the number of such signals, and selector switch means for enabling a selected one of the counting circuits to become operative to receive a train ending signal from the counting means, said selector switch means being operatively associated with the channel group receiving the "favorable" signals and responsive to the quantity of "favorable" signals in each of said signal trains for selecting the counting circuit to receive the train ending signal generated by the counting means.

References Cited in the file of this patent

UNITED STATES PATENTS

| | | |
|---|---|---|
| 2,097,392 | Finch | Oct. 26, 1937 |
| 2,639,386 | Karpeles | May 19, 1953 |
| 2,643,819 | Yuk | June 30, 1953 |
| 2,688,441 | Merrill | Sept. 7, 1954 |
| 2,745,985 | Lewis | May 15, 1956 |
| 2,767,315 | Kosten | Oct. 16, 1956 |